Figure 1:
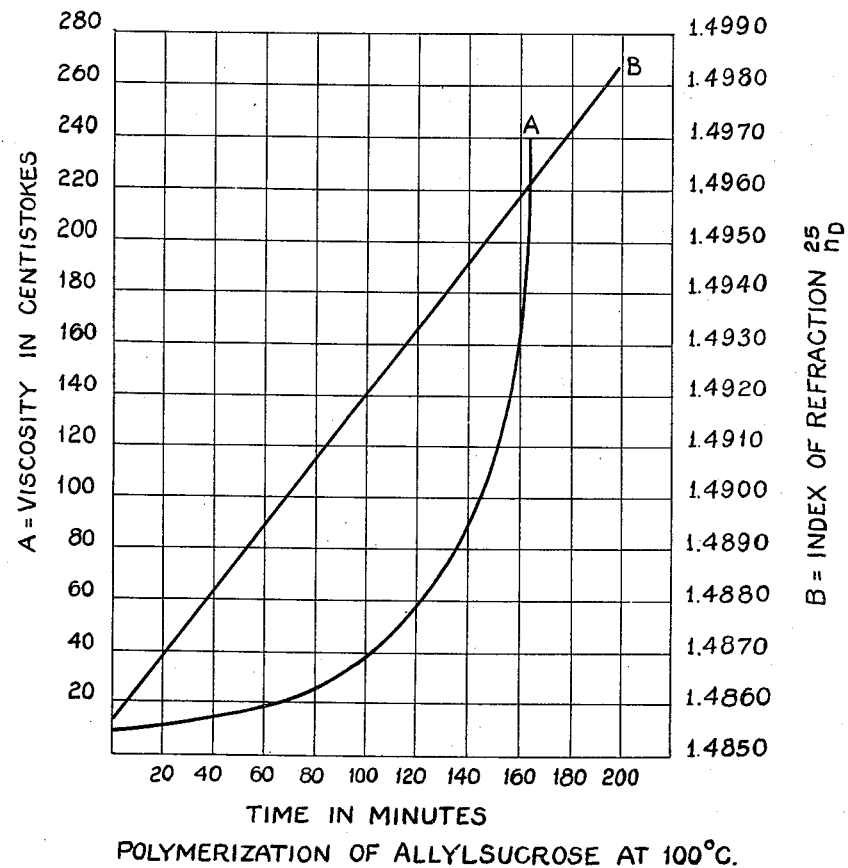

FIG. I.

POLYMERIZATION OF ALLYLSUCROSE AT 100°C.

Patented Nov. 13, 1951

2,574,544

UNITED STATES PATENT OFFICE 2,574,544

PROCESS FOR BREAKING PETROLEUM EMULSIONS

Melvin De Groote, University City, Mo., assignor to Petrolite Corporation, Ltd., Wilmington, Del., a corporation of Delaware Application July 11, 1950, Serial No. 173,047

15 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed is my companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See my co-pending application, Serial No. 173,048, filed July 11, 1950.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present invention is concerned with the breaking of petroleum emulsions of the water-in-oil type characterized by subjecting the emulsion to the action of a demulsifier including hydrophile synthetic products; said hydrophile synthetic products being oxyalkylation products of (a) an alpha-beta alkylene oxide selected from the class consisting of ethylene oxide, propylene oxide, butylene oxide, glycide, methyl-glycide, methyl glycidyl ether, ethyl glycidyl ether and propyl glycidyl ether; and (b) an organic solvent-soluble, oxyalkylation-susceptible polymerization product of a member of the class consisting of allylsucrose, and allylsucrose in combination with other co-polymerizable allyl compounds.

Sub-generically the present invention is concerned with breaking petroleum emulsions of the water-in-oil type characterized by subjecting the emulsion to the action of a demulsifier including hydrophile synthetic products; said hydrophile synthetic products being oxyalkylation products of (A) an alpha-beta oxide selected from the class consisting of ethylene oxide, propylene oxide, butylene oxide, glycide and methylglycide; and (B) an organic solvent-soluble, oxalkylation-susceptible, polymerization product of allylsucrose in which there is present a plurality of allyl radicals; and with the final proviso that the hydrophile properties of said oxyalkylated derivative in an equal weight of xylene are sufficient to produce an emulsion when said xylene solution is shaken vigorously with one to three volumes of water.

The preferred aspect of the invention is concerned with oxyalkylation products in which the weight percentage of allylsucrose is not less than 10% and not over 90%; and the molecular weight of the oxyalkylation products on an average statistical basis, assuming completeness of reaction, is in excess of 10,000.

A sub-generic aspect of the present invention which represents an invention within an invention is described in my co-pending applications, Serial Nos. 146,483, and 146,484, filed February 27, 1950.

For convenience, what is said hereinafter is divided into four parts:

Part 1 is concerned with the preparation of allylsucrose and the description of other allyl compounds which are co-polymerizable with allylsucrose;

Part 2 is concerned with the polymerization or blowing of allylsucrose, or co-polymerizable mixtures of allylsucrose or other allyl derivatives;

Part 3 is concerned with the axyalkylation of the polymerized or blown allylsucrose or allylsucrose mixtures, and Part 4 is concerned with the use of oxyalkylated polymerized allylsucrose or allylsucrose mixtures in resolving or breaking petroleum emulsions of the water-in-oil type.

PART 1

The preparation of allylsucrose has been described in the literature. See Industrial and Engineering Chemistry, volume 41, p. 1697, August 1949, and Sugar, volume 42, No. 9, p. 28

(1947). It has been described also in a pamphlet distributed by the Sugar Research Foundation, Inc., 52 Wall Street, New York city, N. Y., entitled "Preparation and Properties of Allyl Sucrose."

It is expected that this product will be available commercially within a reasonably short period of time. At the moment, however, pilot plant quantities are available. For convenience, what is said hereinafter is substantially a verbatim quotation from the article in Industrial and Engineering Chemistry, cited above, and in which the authors were Zief and Yanovsky.

"Allyl Chloride Method: Two autoclaves were used. One was glass-lined with iron fittings, the other Monel metal. The amount of allyl chloride (and equivalent amount of alkali) was varied in an attempt to find the optimum ratio of reagents. Table I gives the results.

"*Table I.—Preparation of allylsucrose with allyl chloride*

| Autoclave | Moles Allyl Chloride/ Mole Sucrose | Analysis of Product | | | Yield Per cent of Theoretical |
| --- | --- | --- | --- | --- | --- |
| | | Allyl Groups | | Hydroxyl groups | |
| | | Direct | From hydroxyl | | |
| Monel | 8 | 4.7 | 5.7 | 2.3 | 70 |
| Do | 10 | 4.8 | 6.1 | 1.9 | 81 |
| Do | 12 | 5.2 | 6.3 | 1.7 | 90 |
| Glass | 12 | 5.8 | 6.1 | 1.9 | 84 |
| Monel | 16 | 5.5 | 6.6 | 1.4 | 90 |

"As with allyl bromide, apparently the optimum amount of allyl chloride is 12 moles per mole of sucrose. Allylsucrose was prepared as follows:

"1. Sucrose (1000 grams, 2.9 moles) was added with mechanical stirring to a mixture of 1402 grams (35.0 moles) of sodium hydroxide and 700 ml. of water at room temperature in a 2-gallon, glass-lined autoclave equipped with a stirrer and a jacket connected to steam and cold water inlets. Allyl chloride (2680 grams, 35.0 moles) was then added, and the autoclave was sealed and heated to 85° C. (jacket temperature). At the beginning of the reaction and up to about 45° to 50° a valve at the top of the autoclave remained open until the vapors of allyl chloride started to condense at the tip of the valve. Heating during the initial stage of the reaction was carefully controlled, since the reaction is exothermic and a rise in temperature above 83° C. darkens the product considerably. Within 1.5 hours the thermometer well temperature was 82° C., and the internal pressure increased rapidly to 20 per square inch. At this point cold water was circulated through the jacket to moderate the reaction. After this exothermic stage was passed, the well temperature was easily controlled at 80° to 82° C., for 5.5 hours longer. At the end of 8 hours the well temperature was 81° C., and the pressure was down to about 4 pounds. Heating was discontinued at this point, and the autoclave was allowed to cool. The autoclave was then opened and filled with water, with stirring, to dissolve the sodium chloride. The organic layer was separated, steam-distilled, washed with water and treated as described for the allyl bromide preparation. The yield of light brown oil was 1400 grams (83.5% of theoretical) with a refractive index ($n_D^{20}$) of 1.4920. It contained 5.8 allyl groups and 1.9 hydroxyl groups.

"2. Sucrose (500 grams, 1.5 moles) was added with motor stirring to a mixture of 701 grams (17.5 moles) of sodium hydroxide and 350 ml. of water at room temperature in a 1-gallon, jacketed, Monel metal autoclave. Allyl chloride (1340 grams, 17.5 moles) was added, and the autoclave was sealed and heated to 85° C. (jacket temperature) for 8 hours. Because of the better heat transfer of this autoclave, it was not necessary at any time to cool the jacket to moderate the reaction. Within 1.75 hours the internal pressure reached 25 pounds per square inch, and the well temperature was 82° C. At the end of 8 hours the pressure was down to about 4 pounds and the well temperature was 78° C. The autoclave was then cooled and filled with water to dissolve the sodium chloride, and the product was treated as described above. The yield of light brown oil was 783 grams (90% of theoretical), $n_D^{20}$=1.4960. The number of allyl groups was 5.2; the number of hydroxyl groups, 1.7.

"The allyl content was determined as described previously;[1] the hydroxyl content was determined by the method described by Ogg, Porter, and Willits.[2]

As has been pointed out previously allylsucrose can be polymerized alone or in conjunction with other well known polymerizable allyl compounds. Such other allyl compounds which can be employed in admixture with allylsucrose may or may not contain hydroxyl radicals, or for that matter, some other radical such as a carboxyl radical or a radical with hydrogen bound to nitrogen which is also susceptible to oxyalkylation. Some of these compounds will be described subsequently but in the main the procedure of preparing such compound is well known. In connection with such allyl derivatives reference is made to a pamphlet entitled "Allyl Alcohol," issued by Shell Chemical Corporation, 500 Fifth Avenue, New York 18, N. Y., 1946. See also Journal American Chemical Society, volume 71, page 3944, 1949, and "Organic Chemicals," 4th edition, Shell Chemical Company, 500 Fifth Avenue, New York 18, N. Y. See also Data Sheet DS-48:22, "Allyl Glycidyl Ether," Shell Chemical Company, 500 Fifth Avenue, New York 18, N. Y.

Various methods employed for producing suitable allyl compounds include the following:

(1) The esterification of allyl alcohol with a monocarboxy acid such as a higher fatty acid, including oleic acid, ricinoleic acid, etc.

(2) The esterification of allyl alcohol with the acid ester of a polyhydroxy alcohol such as glycerol monophthalate, diglycerol monosuccinate, etc.

(3) The reaction involving alkoxide and allyl chloride (see manufacture of allylsucrose above).

(4) The reaction involving the alkoxide of allyl alcohol and a reactive halogen. (See the preparation of diallyl glycerol in the above noted Journal of American Chemical Society reference.)

(5) The use involving 1-allyloxy-3-chloro-2-propanol.

(6) Reactions involving compounds such as 1,3-dichloropropene.

(7) Allyl alcohol can be treated with alkylene oxides, such as ethylene oxide, propylene oxide, butylene oxide, glycide, etc. The residual hydroxyl group can be used as an intermediate for further reaction. Allyl alcohol can be treated also with epichlorohydrin, or similar chloro-epoxy compounds, so as to give derivatives in which

[1] Nichols, P. L., Jr., and Yanovsky, Elias, J. Am. Chem. Soc., 67, 46 (1945).
[2] Ogg, C. L., Porter, W. L., and Willits, C. O., Ind. Eng. Chem., Anal. Ed., 17, 394 (1945)."

further reaction may involve not only the hydroxyl radical but also the chlorine atom, or both.

(8) Numerous other reactions are included in the literature and particularly the patent literature of allyl resins. In many instances the most satisfactory procedure is to employ allyl glycidyl ether (1-allyloxy-2,3-epoxypropane).

Subsequently there is described in Part 3 procedures involving oxyalkylation, and particularly oxyalkylation involving the use of glycide. The use of allyl glycidyl ether is comparable to the use of glycide. In other words, in the properly chosen reactions a double bond is not involved but only the high reactivity of the epoxide group. Like glycide, or for that matter any other reactive alkylene oxide, allyl glycidyl ether generally does not require the use of a catalyst, particularly an alkaline catalyst, when used in connection with basic nitrogen compounds for instance a reaction involving triethanolamine.

In the treatment of suitable reactants with allyl glycidyl ether the same precaution should be taken, or even greater precaution, than in the use of glycide. If in doubt an initial exploratory synthesis should be undertaken with due precaution and particularly with a means of controlling the heat involved so the speed of reaction can be controlled. Suitable reactants for reaction with allyl glycidyl ether are so numerous that they may be simply indicated as substantially all those which are reactive towards glycide. Generally speaking, this includes almost all compounds having a reactive hydrogen (hydrogen attached to nitrogen, oxygen or sulfur) and in some instances compounds not apparently showing a reactive hydrogen atom. Particularly suitable are materials such as glycerol, diglycerol, higher polyglycerols, sucrose, sorbitol, sorbitan, mannitol, mannitan, etc. Similarly one may employ the same compounds which have been treated with an alkylene oxide other than allyl glycidyl ether, such as ethylene oxide, propylene oxide, glycide, etc.

Other compounds particularly suitable include pentaerythritols, polypentaerythritols, glycose, sugar derivatives such as glycol glucosides of the kind described in U. S. Patents 2,407,001, 2,407,002, and 2,407,003, dated September 3, 1946, to Griffin, tetramethylol cyclohexanol, and allyl starch.

Other materials which may be treated with alkylene oxides so as to change their nature and particularly so as to render them more hydrophile and usually water-soluble, are described in numerous patents, such as British Patents Nos. 341,516, 364,323, 368,530, 380,851, and 411,474. (See also U. S. Patent No. 1,596,785, dated August 17, 1926, to Weyland.) The materials so included cover such diverse products as glue, gelatin, starch, dextrine, alkyl glucosides, albuminous materials, cellulose derivatives soluble in water and soluble in alkali, and also those soluble in nonaqueous solvents, casein, horn, wool, hair, etc. This applies also to synthetic products such as resins, particularly phenol-aldehyde resins or dimers derived from phenols and aldehydes, linear polyamides such as those derived from diamides and dicarboxy acids. This applies also to glucoside ether from polysaccharide ethers, etc., as outlined in U. S. Patent No. 2,258,168, dated October 7, 1941, to White.

Other compounds susceptible to treatment with allyl glycidyl ether include phenols, substituted phenols, cyclic alcohols such as terpineol, tetrahydrofurfuryl alcohol, hydrogenated phenols, etc. Acids (either monocarboxy or polycarboxy) can be reacted with these reagents. Similarly, amines such as tertiary amines containing at least one alkanol radical, or primary or secondary amines which contain an amino hydrogen atom and may or may not contain an alkanol radical, can be used. This applies to polyamines as well as monoamines, mercaptans, such as decyl mercaptan, dodecyl mercaptan, etc.

Allyl glycidyl ether can be reacted with numerous other cellulose derivatives such as those described in U. S. Patents No. 2,033,126, 2,135,128, 2,157,530, 2,055,893, and 2,136,296.

Obviously, the various materials previously described can be converted into derivatives having an amino radical or the number of amino radicals can be increased by reaction with ethylene imine or propylene imine.

Needless to say, such allyl derivatives of the kind enumerated above and intended for use as in preparing a copolymerizable mixture with allylsucrose may be polymerized alone in absence of allylsucrose. Similarly, mixtures of the allyl compounds other than allylsucrose, may be copolymerized to give suitable polymers. In any event, such polymers obtained, in the absence of allylsucrose, from one or more of the allyl compounds or similar allyl compounds can be oxyalkylated in the manner described subsequently in Part 3 so as to yield valuable oxyalkylation derivatives. The products so obtained are useful not only for the purpose of resolving oil field emulsions in the same manner as described in Part 4 but also for other uses such as making emulsions or acting as an emulsion promoter or additive in conjunction with other emulsifying agents. They may be used as deflocculating agents and also as intermediates for further reaction through the terminal hydroxyl radical. In all such instances polymerization can be promoted by peroxide catalysts as well as by blowing. Allylsucrose, as is obvious in light of what has been said previously, is used in two definite senses; one to mean a specific allylsucrose, for instance, penta-allylsucrose specifically; and generically to mean any allylsucrose, or for that matter a cogeneric mixture of one or more allylsucroses. However, this does not lead to confusion because the sense of the text in each instance is obvious.

As examples of suitable mixtures the following are included for purpose of illustration:

Example 1a 750 grams of allylsucrose (principally penta-allylsucrose) were mixed with an equal part of diallyl glycerol. This mechanical mixture was used subsequently in the same manner as allylsucrose.

The above applies to subsequent examples in which no more data will be given other than mixture ratios as they are mechanical mixtures and nothing more.

Example 2a

Sorbitol was reacted in presence of ½% of sodium methylate with 4 moles of allyl glycidyl ether. 750 grams of this end product were mixed with 750 grams of allylsucrose (principally penta-allylsucrose).

Example 3a

Sorbitol was reacted with 6 moles of ethylene oxide and the resultant product reacted with 4 moles of allyl glycidyl ether. Oxyethylated sorbitol is available commercially or can be prepared by well known methods. The treatment with allylglycidyl ether was in the presence of ½% sodium methylate by conventional procedure. 500 grams of this material were mixed with 1,000 grams of allylsucrose (principally penta-allylsucrose).

Example 4a

Tetramethylol cyclohexanol was reacted with 3 moles of allyl glycidyl ether. The reaction was conducted in the same manner as previously described. 1,000 grams of this material were mixed with 500 grams of allylsucrose (principally penta-allylsucrose).

Example 5a

Pentaerythritol was reacted with 4 moles of ethylene oxide and 4 moles of allyl glycidyl ether. 750 grams of this material were mixed with 750 grams of allylsucrose (principally penta-allylsucrose).

Example 6a

Triglycerol obtained by reacting 2 moles of glycide to one mole of glycerol was reacted with 3 moles of allyl glycidyl ether. 650 grams of this product were mixed with 850 grams of allylsucrose (principally penta-allylsucrose).

Example 7a 150 grams of allyl oleate were mixed with 1350 grams of allylsucrose (principally penta-allylsucrose).

Example 8a

Glycerol alpha-allyl ether is mixed with allylsucrose (principally penta-allylsucrose) in the ratio of 1200 grams of allylsucrose and 300 grams of glycerol alpha-allyl ether.

Example 9a

Triethanolamine is treated with allyl glycidyl ether in the ratio of 3 moles of the ether for one mole of the triethanolamine. 300 grams of this material are mixed with 1200 grams of allylsucrose (principally penta-allylsucrose).

Example 10a 1100 parts of allylsucrose (principally penta-allylsucrose) were mixed with 200 parts of diallyl glycerol and 200 parts of glycerol alpha-allyl ether.

Example 11a

One mole of allyl alcohol was reacted with one mole of allyl glycidyl ether so as to produce a compound having two allyl groups and one hydroxyl radical. 150 grams of this material were mixed with 1150 grams of allylsucrose (principally penta-allylsucrose).

Example 12a 150 grams of allyl starch were mixed with 1150 grams of allylsucrose (principally penta-allylsucrose). See Industrial and Engineering Chemistry, volume 35, page 201 (1945).

Example 13a

Allyl oleate was heated to 125° C., and blown with air for 100 hours. At the end of this time the product had turned from a pale yellow to an almost black viscous liquid and indications were that further blowing would cause a stringy polymer. 200 grams of this material were mixed with 1000 grams of allylsucrose (principally penta-allylsucrose).

Example 14a

Allyl ricinoleate was blown in the same manner as indicated in Example 13a, preceding, except that blowing was stopped at the end of 8 hours. This particular product did not discolor and also approached just short of the stringy stage in 20% less time than in the case of the oleate. 250 grams of this product were mixed with 1250 grams of allylsucrose (principally penta-allylsucrose).

Example 15a

An allyl naphthenate was prepared from a light colored naphthenic acid obtained from California crude. The specifications on this particular naphthenic acid are as follows:

| | |
|---|---|
| Acid number, oil-free | 247 |
| Unsaponifiable content (percent by weight) | 7 |
| Color (ASTM) | 3–3½ |
| Water content (per cent by weight) | 0.3 |
| Viscosity at 100° F., S. S. U | 300 |
| Specific gravity, 60° F | 0.98 |

This particular allyl compound was blown for 87 hours until just short of the stringy stage. It disclosed only slightly. 250 grams of this blown product were mixed with 1250 grams of allyl sucrose (principally penta-allylsucrose).

Example 16a 250 grams of glycerol alpha-allyl ether monooleate were mixed with 1250 grams of allylsucrose (principally penta-allylsucrose).

Example 17a 250 grams of glycerol alpha-allyl ether monoricinoleate were mixed with 1250 grams of allylsucrose (principally penta-allylsucrose).

Example 18a 250 grams of glycerol alpha-allyl ether mononaphthenate were mixed with 1250 grams of allylsucrose (principally penta-allylsucrose). The naphthenic acid used to form the fractional ester was the particular one described under the heading of Example 15a, preceding.

Example 19a

Diallyl phthalate was blown until it became rubbery. The temperature of blowing was 112.5° C. The time required was 19½ hours. The polymerization was then repeated under identical conditions but polymerization stopped 9 hours short of this time, i. e., at the end of 10½ hours. 250 grams of the partially polymerized diallyl phthalate above described were mixed with 1250 grams of allylsucrose (principally penta-allylsucrose).

Example 20a

Diallyl catechol was blown for 45½ hours. At the end of this time the product was a semi-rubbery mass. The temperature of blowing was 110° C. The process was repeated and the oxidizing stopped 8 hours short of the previous stage, i. e., at the end of 37½ hours. 250 grams of this partially polymerized diallyl catechol were mixed with 1250 grams of allylsucrose (principally penta-allylsucrose).

As to the preparation of diallyl catechol, and diallyl resorcin see U. S. Patent No. 2,459,835, dated January 25, 1949, to Monroe.

Needless to say, mixtures containing an allylsucrose need not be binary mixtures but can have three or more components, as, for example, a mixture consisting of one-third each of allylsucrose, diallyl glycerol and the sorbitol derivative described in Example 2a, preceding. A more complex mixture would consist of one-fourth part each of allylsucrose, diallyl glycerol, the sorbitol derivative as described under the heading of Example 2a, and the tetramethylol cyclohexanol mixture described under the head of Example 4a.

PART 2

In regard to polymerization of allylsucrose reference is made again to the aforementioned Zief and Yanovsky article in Industrial and Engineering Chemistry.

The following table, data, etc., are in substantially verbatim form as they appear therein:

"POLYMERIZATION

"A previous article [3] pointed out that for some applications—for example, coating materials—it is advisable to oxidize the product partially to increase viscosity. Since, during this partial polymerization, the refractive index increase parallels the increase in viscosity, by observing the change in refractive index and interrupting the oxidation at a standard value, uniform results will be obtained. Figure 1 shows the viscosity and refractive index curves for a laboratory batch of allylsucrose made with allyl bromide. Since laboratory preparations are fairly well standardized with regard to allyl content, viscosity, refractive index, and gelation time, reproducible results were obtained whenever the partial polymerization was interrupted at the same refractive index.

"Allylsucrose prepared in a glass-lined autoclave with allyl chloride has a lower allyl content than the products prepared with allyl bromide and, hence, gives different values for viscosity, refractive index, and gelation time. The viscosity-refractive index curves will, therefore, be somewhat different from those in Figure 1 but will serve the same purpose. The curves for allylsucrose made in a Monel metal autoclave will also be different for, in addition to having a different degree of allylation, the product will be partially polymerized.

"The point at which the preliminary polymerization is stopped is determined by two factors. The closer the refractive index is to the gelation point, the quicker will the film of allylsucrose become tack-free on exposure to air. Thus a 50% solution of allylsucrose in toluene or turpentine (having a refractive index of 1.4940) with 0.1% of cobalt (as naphthenate or octoate) dried tack-free in 60 to 90 minutes at room temperature. On the other hand, allylsucrose, particularly when partially polymerized, has a tendency to polymerize and eventually gel, even at room temperature. It is important, therefore, to know how long the polymerized substance will be kept before use.

"The effect of storage on monomeric and partially polymerized allyl sucrose was investigated. Allylsucrose (6.7 allyl groups) was polymerized at 100° C. At several points (Figure 1) 25-cc. samples were withdrawn, put into glass vials closed with plastic screw caps, and stored on a laboratory shelf at room temperature (about 25° C.). From time to time the index of refraction of each sample was examined. Table II gives the results.

"Table II shows clearly that, whereas the allylsucrose as prepared (sample 1) scarcely changed during a year of storage, the partially polymerized samples of refractive index 1.4920 or higher gelled at various intervals during this period; the sample of refractive index 1.4911 closely approached the gelation point after 12-month storage. Although sample 7 gelled in about 4 months, 50% solutions of the same samples in toluene and turpentine showed no sign of gelation after a year of storage.

"Table II.—Change in refractive index of allylsucrose during storage

| Sample No. | Refractive Index, $n_D^{25}$ | | | | | | | |
|---|---|---|---|---|---|---|---|---|
| | At start | 5 weeks | 10 weeks | 18 weeks | 26 weeks | 32 weeks | 43 weeks | 52 weeks |
| 1 | 1.4846 | 1.4847 | 1.4848 | 1.4848 | 1.4849 | 1.4851 | 1.4853 | 1.4857 |
| 2 | 1.4890 | 1.4892 | 1.4899 | 1.4901 | 1.4906 | 1.4909 | 1.4910 | 1.4910 |
| 3 | 1.4900 | 1.4904 | 1.4909 | 1.4913 | 1.4920 | 1.4922 | 1.4928 | 1.4930 |
| 4 | 1.4911 | 1.4913 | 1.4919 | 1.4925 | 1.4931 | 1.4938 | 1.4942 | 1.4944 |
| 5 | 1.4920 | 1.4925 | 1.4930 | 1.4937 | 1.4948 | Gelled | | |
| 6 | 1.4930 | 1.4933 | 1.4940 | Gelled | | | | |
| 7 | 1.4941 | 1.4947 | 1.4948 | Gelled | | | | |
| 8 | 1.4949 | 1.4950 | Gelled | | | | | |
| 50% soln. of No. 7 in Turpentine | 1.4791 | 1.4792 | 1.4793 | 1.4793 | 1.4795 | 1.4798 | 1.4799 | 1.4799 |
| Toluene | 1.4937 | 1.4941 | 1.4940 | 1.4940 | 1.4941 | 1.4946 | 1.4950 | 1.4953 |

"[3] Nichols, P. L., Jr., and Yanovsky, Elias, Sugar, 42, No. 9, 28 (1947)."

(Hereto attached Figure 1 corresponds to Figure 1 in the text of the original article.)

The semi-commercial samples of allylsucrose available appear to contain a small amount of volatile aromatic solvent. The actual blowing operation appears to be checked until this bit of aromatic solvent has been blow out. Such allylsucrose can, of course, be blown with or without agitation. Agitation in essence speeds up the polymerization reaction for obvious reasons. It is in essence more vigorous blowing conveniently controlled. In the aforementioned Zief and Yanovsky article referred to in detail above it is, of course, obvious that these investigators were interested perhaps primarily in obtaining a material suitable as a coating. This meant that the blowing operation might well be conducted with a view of preventing darkening and also with a view of obtaining material which was still uniformly soluble in a solvent, such as toluene or xylene. In the instant invention blown or polymerized allylsucrose is nothing more than an intermediate for further reaction. Color or solubility of the kind which might be desirable in a coating is not critical for the instant purpose.

Below are three typical examples in which various degrees of polymerization have been obtained by blowing. Allylsucrose or allylsucroses can be polymerized by peroxides such as benzoyl peroxide, in a conventional manner but the procedure is less satisfactory than air blowing. The final resultant products are probably substantially identical provided, of course, that the peroxide polymerization has not been conducted so as to result in an insoluble compound or mixture. It is hardly necessary to add to what has appeared in the literature in regard to the art of polymerization by blowing of allylsucrose but the following examples are included for illustration and for the reason that cognizance has been taken of the fact that allylsucrose (approximately 5 allyl groups on the average per sucrose molecule) is somewhat dispersible in water, and also somewhat dispersible in the initial stage of polymerization. However, in the latter stage of oxidation or polymerization this is not true as is illustrated by the subsequent examples. These various allyl compounds can be polymerized in the same manner employed to polymerize allyl esters. See U. S. Patent No. 2,374,081, dated April 17, 1945, to Dean.

*Example 1b*

The allylsucrose was blown on a laboratory scale using approximately 1500 grams of allylsucrose in a 3-liter flask. The terminal air inlet was provided with a device which gave a multiplicity of small, fine bubles. The rate of air was such that there was a continuous stream of air passing through the reaction mass sufficient to provide at least moderate agitation. The data in the following table do not require explanation:

| Temperature, °C. | Time, Minutes | Index of Refraction | Water Solubility |
|---|---|---|---|
| 25 | 0 |  | Dispersible. |
| 90 | 25 | 1.4883 | Do. |
| 95 | 45 | 1.4887 | Do. |
| 99 | 75 | 1.4880 | Do. |
| 99 | 105 | 1.4882 | Do. |
| 100 | 135 | 1.4885 | Do. |
| 95 | 180 | 1.4895 | Do. |
| 98 | 210 | 1.4892 | Do. |
| 105 | 270 | 1.4900 | Do. |
| 100 | 330 | 1.4900 | Do. |
| 90 | 360 | 1.4907 | Do. |
| 96 | 390 | 1.4915 | Do. |
| 104 | 420 | 1.4922 | Less dispersible. |
| 100 | 440 | 1.4937 | Insoluble. |
| 100 | 460 | 1.4942 | Do. |
| 100 | 480 | 1.4950 | Do. |
| 100 | 490 | 1.4955 | Do. |
| 100 | 510 | 1.4960 | Do. |
| 100 | 540 | 1.4960 | Do. |

In the above experiment the change in refractive index after about 45 minutes of blowing probably meant that all the solvent present had been eliminated. Also, note that when the oxidation stage, which required about 9 hours in all, was about eighty per cent complete the product no longer showed dispersibility comparable to the initial product or the early stages of polymerization. This product was considered as the result of mild blowing, or mild polymerization. See what is said in regard to such characterization in the discussion of the next example.

*Example 2b*

The same procedure was employed as in Example 1b except that a stirring device was included along with the distributing vent. In this instance the temperature was held at 130° C. for three hours, at the end of which time the product still showed dispersibility. It was then held at 100° for two more hours. At the end of this time the product was not water-soluble and was very stringy or even semi-rubbery. When diluted with an equal weight of xylene the dilute solution was still very viscous and somewhat rubbery. The refractive index was 1.4985. Note that this is a higher figure than is shown in the table referred to in the article by Zief and Yanovsky. For purpose of convenience in referring to blown allylsucrose I have used terminology somewhat comparable to that applied in regard to other blown products, such as blown castor oils. I have considered a product which is blown to just short of the rubberystage and is exemplified by Example 1b, preceding, as mildly oxidized, mildly blown, or mildly polymerized. I have used the expression "drastic polymerization" to indicate a product which is not only stringy or rubbery as such but also is highly viscous and shows stringiness or rubberiness in a 50% xylene solution or as a solution in other suitable solvents. Such stage is typified by the present example, i. e., Example 2b.

I have used the expression "semi-drastically blown," or "semi-drastically polymerized," to indicate a product which shows incipient stringiness as such but where such stringiness disappears on dilution. Such product is illustrated by the next example.

*Example 3b*

The same procedure was employed in every respect as in Example 2b except that the second stage of oxidation at 100° C. was permitted to take place for 1½ hours only instead of 2 hours, and the refractive index at the end of this time was 1.4980. The product showed a definite tendency to string or rubberize but this property practically disappeared when a 50% solution in xylene was prepared.

Actually blowing or polymerizing can be conducted with ozone or ozonized air as well as air which may or may not have its moisture content eliminated. In this particular type of reaction I have found no advantage in going to any added cost in regard to the oxygenating procedure which initiates polymerization. In the polymerization of compounds in which basic amino radicals are present I prefer to use air which has been stripped of carbon dioxide by means of soda lime or any other convenient means.

The same is true of a catalyst, such as lead, manganese or cobalt naphthenate or the like as has been described in the literature previously mentioned. Such catalyst in comparatively small amounts, one-tenth per cent or preferably less, will speed up the polymerization but here again I have not found this particularly desirable. Since it is usually intended to stop the polymerization at some particular point by use of a mild blowing or a semi-drastic blowing or a drastic blowing, it is of greater convenience to approach the end point slowly rather than rapidly, and also to have polymerization cease when the air stream stops.

Referring again to the development of allylsucrose, as has been pointed out, one of the objectives appears to be concerned with a suitable coating material. Everything else being equal presumably the fewer hydroxyl radicals available in the coating material the better. On the other hand as an intermediate reactant this need not apply. Sucrose as an initial raw material has 8 hydroxyl radicals. Diallylsucrose, of course, would have an excess of hydroxyl radicals over allyl radicals and would not possibly be particularly suitable for a coating material. This does not apply to its use as an intermediate as herein described. The same would be true of triallylsucrose or tetra-allylsucrose. The product now available in at least pilot plant quantities and perhaps shortly in commercial quantities appears to be largely the penta-allylsucrose with some tetra-allylsucrose, and possibly some hexa-allylsucrose present, with perhaps minor amounts or almost insignificant amounts of other allyl-sucroses. Tetra-allylsucrose, in which the allyl radicals and the hydroxyl radicals are equal, is a particularly suitable reactant. In penta-allyl-sucrose and hexa-allylsucrose there are more allyl radicals than hydroxyl radicals. The effect of this variation in the molecule is significant, particularly insofar that it affects the molecular weight of the ultimate oxyalkylated product described subsequently in at least two ways: (a) The more hydroxyl radicals the more long ether chains which can be added per molecule. (b) On the other hand the more allyl radicals probably the larger the polymerized molecule although this may not be true. It may be better to assume the more allyl radicals the more readily the product can be blown or polymerized. Excessive polymerization eliminates solvent solubility. The product resulting from polymerization must meet this solubility test, and must also be susceptible to oxyalkylation in absence of a solvent and particularly oxyalkylation in presence of a solvent.

There is a fairly narrow range where the product if given "super-drastic" treatment is only partially soluble at the most in xylene or the like but is still soluble, at least sufficient for the purpose, in a semi-polar solvent such as dioxane, ethylene glycol diethyl ether, diethylene glycol diethyl ether and tetraethylene glycol dimethyl ether.

Other solvents include hydrogenated aromatic materials such as tetralin and decalin, and ethers containing an aromatic radical such as p-tert-amylphenyl methyl ether, p-tert-amylphenyl n-butyl ether, n-butyl phenyl ether, or more highly oxygenated solvents obtained by treating benzyl alcohol or phenol or alkylated phenol with 1, 2 or 3 moles of an alkylene oxide, such as ethylene oxide or propylene oxide, followed by methylation so as to convert the terminal oxygen-linked hydrogen atom into a methyl radical.

Stringiness or rubberiness as described above is probably an indication of incipient cross-linking or gelation. In any event the allylsucroses and particularly those having a plurality of allyl groups as differentiated from monallylsucrose, can be divided into three classes: (1) Those in which there are more hydroxyl radicals than allyl radicals, with (2) the number of hydroxyl radicals and allyl radicals approximately equal, and (3) where the number of allyl radicals are greater than hydroxyl radicals. As previously stated, the commercial product or semi-pilot plant product now available is on a statistical basis approximately penta-allylsucrose and in actual composition represents primarily penta-allylsucrose with some hexa, some tetra, and perhaps other allyl compounds present.

Incipient polymerization means dimerization and trimerization. It is probable that in the procedure above described that higher polymers such as tetramers, pentamers, etc., are formed to a greater or lesser degree. However, at some subsequent stage as soon as more than incipient cross-linking takes place the polymers are no longer soluble in xylene or in some of the semi-polar solvents described, or in a mixture of the two. It is to be noted that the solvents of the semi-polar type are characterized by the fact that they may be present in the subsequent oxyalkylation step and are not susceptible to oxyalkylation. It is to be noted also that in the subsequent description of the oxyalkylation step (Part 3) it becomes obvious that with a tetramer or pentamer and probably even in the case of a trimer, one may readily obtain derivatives in which the molecular weights are in the neighborhood of 1,000,000 or thereabouts.

Part 3

Numerous derivatives of the kind described in Part 2, preceding, have been prepared on a scale varying from a few hundred grams on a laboratory scale to larger amounts. This applies also to the preparation of oxyalkylated compounds of the kind or type comparable to those with which this third part of the text is concerned. In preparing a large number of examples I have found it particularly advantageous to use laboratory equipment which permits continuous oxypropylation and oxyethylation. More specific reference will be made to treatment with glycide, subsequently in the text. The oxypropylation step is, of course, the same as the oxyethylation step insofar that two low boiling liquids are handled in each instance. What immediately follows refers to oxyethylation and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at lease one connection for conducting the incoming alkylene oxide, such as ethylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections.

This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxyethylations become uniform in that the reaction temperature could be held within a few degrees of any selected point in this particular range. In the early stages where the concentration of catalyst is high the temperature was generally set for around 150° C. or thereabouts. Subsequently temperatures up to 170° C. or higher may be required. It will be noted by examination of subsequent examples that this temperature range was satisfactory. In any case, where the reaction goes more slowly a higher temperature may be used, for instance, 165° C. to 180° C., and if need be 185° C. to 190° C. Incidentally, oxypropylation takes place more slowly than oxyethylation as a rule and for this reason we have used a temperature of approximately 160° C. to 165° C., as being particularly desirable for initial oxypropylation, and have stayed within the range of 165° C. to 185° C., almost invariably during oxypropylation. The ethylene oxide was forced in by means of nitrogen pressure as rapidly as it was absorbed as indicated by the pressure gauge on the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 170° C. In this instance the technique employed was the same as before, that is, either cooling water was cut down or steam was employed, or the addition of propylene oxide speeded up, or electric heat used in addition to the steam in order that the reaction proceeded at, or near, the selected temperatures to be maintained.

Inversely, if the reaction proceeded too fast regardless of the particular alkylene oxide, the amount of reactant being added, such as ethylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as we are aware, can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in U. S. Patent No. 2,499,370, dated March 7, 1950, and offered for sale by numerous laboratory supply houses. If such arrangement is used to prepare laboratory scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this part; but in any event, when the initial amount of glycide is added to a suitable reactant, such as a polymerized allylsucrose or a polymer derived from an allylsucrose mixture, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

As has been pointed out previously oxyalkylation involving the use of allyl glycidyl ether is conducted in a manner similar to glycide, although in the main this latter reactant appears at times to be more reactive and if in doubt as to the suitability of any particular equipment or procedure it should be cautiously explored before adoption, either on a laboratory scale, pilot plant scale, or large scale. Reactions involving glycide probably takes place more rapidly and at lower temperature than allyl glycidyl ether; for instance, at 100° to 120° C. If the reaction does not take place at this temperature, the temperature should be increased slightly, and particularly slowly and cautiously. If the reaction does take place at this temperature and starts to proceed too rapidly it should be controlled carefully. Briefly, the lowest temperature of reaction should be employed which is consistent with uniform and constant reaction without a tendency either to accelerate to a degree suggesting violent reaction or slowing down to a degree which indicates that any of the glycide will be left over in uncombined state.

Although ethylene oxide and propylene oxide may represent less of a hazard than glycide, yet these reactants should be handled with extreme care. One suitable procedure involves the use of propylene oxide or butylene oxide as a solvent as well as a reactant in the earlier stages along with ethylene oxide, for instance, by dissolving the appropriate resin propylene oxide even though oxyalkylation is taking place to a greater or lesser degree. After a solution has been obtained which represents the selected resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner. See article entitled "Ethylene Oxide Hazards and Methods of Handling," Industrial and Engineering Chemistry, volume 42, No. 6, June 1950, pp. 1251-1258.

*Example 1c*

| | Grams |
|---|---|
| Blown allyl sucrose identified as Example 3b preceding | 421 |
| Ethylene oxide | 990 |
| Xylene | 421 |
| Sodium methylate | 10 |

The above mixture was placed in an autoclave and adjustment made so that the temperature would vary between 180° to 200° C. The pressure control was set so that the pressure would not go above 190 p. s. i. during the operation. The time period regulator was set so as to inject the ethylene oxide in 3 hours and then continue stirring for a half hour longer. The reaction went readily and, as a matter of fact, the ethylene oxide could have been injected in less than an hour's time and probably the reaction would have been completed without allowing for a subsequent stirring period.

The product so obtained calculated back to composition in terms of the reactants was as follows:

| | Per cent | Per cent |
|---|---|---|
| Blown allyl sucrose | 29.9 | 23.0 |
| Ethylene oxide | 70.1 | 54.0 |
| Xylene | — | 23.0 |

The product was xylene soluble and water emulsifiable.

*Example 2c*

| | Grams |
|---|---|
| Blown allyl soucrose (same as Example 1c above) | 419 |
| Xylene | 419 |
| Sodium methylate | 10 |
| Propylene oxide | 1205 |

In this instance the automatic apparatus was set so that the propylene oxide was introduced in a two and one-half hour period and an additional half hour added for completion of reaction. The temperature range was set between 165° and 180° C. The maximum temperature actually reached was 175° C. The pressure regulator was set for 160 p. s. i. maximum. The highest pressure reached, however, was only 150 p. s. i. The composition so obtained on a xylene-free and xylene-containing basis is as follows:

| | Per cent | Per cent |
|---|---|---|
| Blown allyl sucrose | 25.6 | 20.5 |
| Propylene oxide | 74.4 | 59.0 |
| Xylene | — | 20.5 |

The product was xylene soluble and water insoluble.

*Example 3c*

1,231 grams of the product identified as 1c preceding and representing 283 grams of blown allyl sucrose, 283 grams of xylene and 665 grams of ethylene oxide was treated in the same manner as before with an additional 370 grams of ethylene oxide. During this operation, the automatic equipment was set for a maximum temperature of 200° C., a maximum pressure of 200 p. s. i. and for a reaction time of 30 minutes with a subsequent stirring period of another 30 minutes. No additional sodium methylate was employed. At the end of the reaction the composition on both the xylene-free and xylene-containing basis was as follows:

| | Per cent | Per cent |
|---|---|---|
| Blown allyl sucrose | 21.5 | 17.7 |
| Ethylene oxide | 78.5 | 64.6 |
| Xylene | — | 17.7 |

The product was xylene soluble and water soluble.

*Example 4c*

1,070 grams of the product identified as 3c preceding and representing 191 grams of blown allyl sucrose, 191 grams of xylene and 698 grams of ethylene oxide were treated with 995 grams of propylene oxide. 10 grams of sodium methylate were added as a catalyst. The automatic equipment was set for a maximum temperature of 200° C. and a maximum pressure of 165 p. s. i. The maximum pressure reached during the reaction, however, was only 150 p. s. i. The equipment was set to introduce the propylene oxide in one hour with a subsequent stirring period of one-half hour. The reaction could have been completed in considerably less time due to the added catalyst. The composition of the product on both a xylene-free and a xylene-containing basis is as follows:

| | Per cent | Per cent |
|---|---|---|
| Blown allyl sucrose | 10.1 | 9.2 |
| Ethylene oxide | 37.1 | 33.7 |
| Propylene oxide | 52.8 | 47.9 |
| Xylene | — | 9.2 |

The product was both water soluble and xylene soluble.

*Example 5c*

957 grams of the product identified as 2c preceding and representing 196 grams of blown allyl sucrose, 565 grams of propylene oxide, and 196 grams of xylene was mixed with an additional 10 grams of sodium methylate and then reacted with an additional 1355 grams of propylene oxide. The automatic process equipment was set to introduce the propylene oxide in an hour and stirring for an additional forty-five minutes. The equipment was set for a maximum temperature of 175° C. and a maximum pressure of 150 p. s. i. In this instance, however, the pressure never got above 100 p. s. i. The composition of the product both on a xylene-free and a xylene-containing basis is as follows:

| | Per cent | Per cent |
|---|---|---|
| Blown allyl sucrose | 9.2 | 8.5 |
| Propylene oxide | 90.8 | 83.0 |
| Xylene | — | 8.5 |

The product was xylene soluble and water insoluble.

*Example 6c*

600 grams of a product previously identified as 2c preceding representing 123 grams of blown allyl sucrose, 354 grams of propylene oxide and 123 grams of xylene was mixed with 5 grams of sodium methylate and then reacted with 490 grams of ethylene oxide. The equipment was set for a maximum temperature of 165° C. and for a maximum pressure of 200 p. s. i. However, in this particular instance the automatic equipment did not function properly and actually a maximum pressure of 230 p. s. i. was reached.

The composition of the product on both a xylene-free and xylene-containing basis was as follows:

|  | Per cent | Per cent |
|---|---|---|
| Blown allyl sucrose | 12.7 | 11.3 |
| Propylene oxide | 36.6 | 32.4 |
| Ethylene oxide | 50.7 | 45.0 |
| Xylene | — | 11.3 |

The product was soluble in both xylene and in water.

Example 7c 1,197 grams of the product identified as 4c and representing 110 grams of allyl sucrose, 403 grams of ethylene oxide, 574 grams of propylene oxide and 110 grams of xylene was mixed with 5 grams of sodium methylate and then reacted with 1,335 grams of propylene oxide. The equipment was set for a reaction period of one hour followed by thirty minutes of stirring. The automatic devices were set for a maximum temperature of 175° C. and a maximum pressure of 155 p. s. i. The maximum pressure reached, however, was only 110 p. s. i. The composition of the product on both a xylene-free and xylene-containing basis is as follows:

|  | Per cent | Per cent |
|---|---|---|
| Blown allyl sucrose | 4.5 | 4.25 |
| Ethylene oxide | 16.6 | 16.0 |
| Propylene oxide | 78.9 | 75.5 |
| Xylene | — | 4.25 |

The product was emulsifiable in water and xylene soluble.

Example 8c 666 grams of the product identified as 5c preceding representing 56.5 grams of blown allyl sucrose, 553 grams of propylene oxide, and 56.5 grams of xylene was reacted with 425 grams of ethylene oxide. The time was set for a forty-five minute reaction period with a subsequent forty-five minutes for stirring. The equipment was set for a maximum temperature of 185° C. and a maximum pressure of 250 p. s. i. The composition of the product on both a xylene-free and a xylene containing basis is as follows:

|  | Per cent | Per cent |
|---|---|---|
| Blown allyl sucrose | 5.5 | 5.2 |
| Propylene oxide | 53.4 | 50.6 |
| Ethylene oxide | 41.1 | 39.0 |
| Xylene | — | 5.2 |

The product was soluble in both water and xylene.

Example 9c 1,045 grams of the product identified as 7c preceding representing 44 grams of blown allyl sucrose, 167 grams of ethylene oxide and 790 grams of propylene oxide was treated with an additional 760 grams of propylene oxide. The reaction equipment was satisfactory for a maximum temperature of 175° C. and a maximum pressure of 200 p. s. i. The time period was one hour for reaction and one hour for stirring. The maximum pressure, however, only reached 150 p. s. i. The composition of the product both on the xylene-free and xylene-containing basis is as follows:

|  | Per cent | Per cent |
|---|---|---|
| Blown allyl sucrose | 2.5 | 2.4 |
| Ethylene oxide | 9.5 | 9.2 |
| Propylene oxide | 88.0 | 86.0 |
| Xylene | — | 2.4 |

The product was dispersible in water and soluble in xylene.

Example 10c 985 grams of the mixture identified as 5c preceding representing 83.5 grams of blown allyl sucrose, 818 grams of propylene oxide and 83.5 grams of xylene was reacted with an additional 1,075 grams of propylene oxide. The reaction time was set for an hour and one-half and the stirring period for an additional half hour. The equipment was set for a maximum temperature of 185° C. and a maximum pressure of 200 p. s. i. Actually, the pressure never reached higher than 150 p. s. i. and the reaction could have been completed in less than an hour, possibly as little as a half hour. The composition of the product on both a xylene-free and xylene-containing basis is as follows:

|  | Per cent | Per cent |
|---|---|---|
| Blown allyl sucrose | 4.2 | 4.0 |
| Propylene oxide | 95.8 | 92.0 |
| Xylene | — | 4.0 |

The product is just barely dispersible in water, perhaps better characterized as being insoluble but was soluble in xylene.

Example 11c 713 grams of the product identified as 10c preceding representing 28.5 grams of blown allyl sucrose, 656 grams of propylene oxide and 28.5 grams of xylene was mixed with 5 grams of sodium methylate and reacted with 475 grams of ethylene oxide. The equipment was set for a reaction period of forty-five minutes and a stirring period of an additional forty-five minutes. It was set for a maximum temperature of 160° C. and a maximum pressure of 180 p. s. i. The maximum pressure reached, however, was only 150 p. s. i. and the reaction was so fast the procedure could have been completed in one-half or one-third of the time indicated. The composition of the material both on a xylene-free and a xylene-containing basis is as follows:

|  | Per cent | Per cent |
|---|---|---|
| Blown allyl sucrose | 2.5 | 2.4 |
| Propylene oxide | 56.6 | 55.2 |
| Ethylene oxide | 40.9 | 40.0 |
| Xylene | — | 2.4 |

The product was soluble in both xylene and in water.

Example 12c 758 grams of the product identified as 10c preceding representing 30.5 grams of blown allyl sucrose, 697 grams of propylene oxide and 30.5 grams of xylene was mixed with 5 grams of sodium methylate and treated with 555 grams of propylene oxide. The equipment was set for a reaction period of eight hours followed by two hours stirring on the following day. The temperature was set for a maximum of 180° C. but in this instance did not reach more than 170° C. The pressure device was set for a maximum of 200 p. s. i. but failed to act properly and the pressure actually reached 250 p. s. i. The composition of the product on both a xylene-free and a xylene-containing basis is as follows:

|  | Per cent | Per cent |
|---|---|---|
| Blown allyl sucrose | 2.4 | 2.3 |
| Propylene oxide | 97.6 | 95.4 |
| Xylene | — | 2.3 |

The product was soluble in xylene but hardly dispersible in water. It would better be identified as water insoluble.

The same procedure employed in Examples 1c to 12c, inclusive, was used to prepare samples from a more highly polymerized allylsucrose, particularly the kind identified as Example 2b, preceding. The procedure employed in oxyalkylation, whether using ethylene oxide or propylene oxide or a combination of the two, was substantially the same. In each instance where the compounds had present both ethylene oxide and propylene oxide as exemplified by Examples 20c through 26c in the succeeding table they were prepared in a variety of ways, such as (a) first adding all the ethylene oxide and then the propylene oxide, or (b) adding the propylene oxide and then the ethylene oxide, or (c) adding a mixture of the two oxides in a single step. In each instance xylene was present as a solvent but other suitable solvents such as decalin, xylene or the like, could be used. Sodium methylate was used as a catalyst in each instance but any other catalyst would be just as satisfactory. The amount of catalyst added in the initial stage was equivalent, roughly, to 2% of the blown allylsucrose. In the final steps if the percentage dropped much below ½% to ¾% sufficient sodium methylate was added to bring the amount of catalyst at the end of the reacttion up to about ½%. Caustic soda or caustic potash could be used instead of sodium methylate, or other catalysts could be employed, as is well known. The solubility of the products varied, as noted, from xylene solubility, or for that matter solubility in no-aromatic kerosene, to a stage where the product was completely soluble in water and foamed in water on shaking.

In all these instances the operating conditions were substantially the same as far as temperature and pressure goes, i. e., oxyalkylation temperature of 150° to 200° C. and slightly in excess thereof, and a maximum operating pressure of 150 pounds per square inch up to 220 or 225 pounds per square inch. In some instances the reactions took place with even less pressure, i. e., less than 150 pounds per square inch and rarely got slightly higher.

Operation was about the same in all instances, i. e., the equipment was set usually so as to inject anywhere from 100 to 200 grams of an oxide, up to a kilogram, per hour. The rate of stirring was about the same, whatever was indicated as convenient, usually running from 150 R. P. M. up to 450 R. P. M. Reactions, of course, could be speeded up in every instance by increasing the amount of catalyst; increased speed of reaction meant that reaction would take place in less time, or at a lower temperature, or at less pressure, or comparable conditions. As a matter of fact, using a longer period of time and an increased amount of catalyst oxyalkylations could be conducted at a temperature approximately that of the boiling point of water, for instance 95° to 115° C., with practically no pressure at all, or in any event at less than 30 or 40 pounds per square inch. Such procedure is well known but will be described briefly subsequently.

The appearance of all these derivatives was more or less the same. They varied from very light straw-colored viscous liquids to dark amber-colored viscous liquids. This appearance was on a solvent-free basis.

| Oxyalkylated Compound Ex. No. | Allylsucrose Compound Ex. No. | Composition on Solvent-free Basis, Percentage by Weight | | |
|---|---|---|---|---|
| | | Amt. | Ethylene Oxide | Propylene Oxide |
| | | Grams | Grams | Grams |
| 13c | 2b | 2.5 | --------- | 97.5 |
| 14c | 2b | 3.0 | --------- | 97.0 |
| 15c | 2b | 4.0 | --------- | 96.0 |
| 16c | 2b | 5.0 | --------- | 95.0 |
| 17c | 2b | 6.0 | --------- | 94.0 |
| 18c | 2b | 7.0 | --------- | 93.0 |
| 19c | 2b | 10.0 | --------- | 90.0 |
| 20c | 2b | 2.5 | 2.5 | 95.0 |
| 21c | 2b | 3.0 | 3.0 | 94.0 |
| 22c | 2b | 4.0 | 4.0 | 92.0 |
| 23c | 2b | 5.0 | 5.0 | 90.0 |
| 24c | 2b | 6.0 | 6.0 | 88.0 |
| 25c | 2b | 7.0 | 7.0 | 86.0 |
| 26c | 2b | 10.0 | 10.0 | 80.0 |
| 27c | 2b | 2.5 | 97.5 | --------- |
| 28c | 2b | 3.0 | 97.0 | --------- |
| 29c | 2b | 4.0 | 96.0 | --------- |
| 30c | 2b | 5.0 | 95.0 | --------- |
| 31c | 2b | 6.0 | 94.0 | --------- |
| 32c | 2b | 7.0 | 93.0 | --------- |
| 33c | 2b | 10.0 | 90.0 | --------- |
| 34c | 2b | 30.0 | 70.0 | --------- |
| 35c | 2b | 40.0 | 60.0 | --------- |
| 36c | 2b | 50.0 | 50.0 | --------- |

In using other alkylene oxides, particularly glycide, the procedure was much the same except that the treatment with glycide generally involved the use of a glass reaction vessel as previously described. By and large the effect of glycide was about the same as adding a somewhat smaller amount of ethylene oxide. Stated another way, if a product were treated with propylene oxide and then with a small amount of ethylene oxide substantially the same results could be obtained by adding a somewhat decreased amount of glycide instead of ethylene oxide. This was true when the glycide was used also. However, different results were obtained apparently when glycide was added at an earlier stage for the reason that branching was involved. This can be illustrated by the following: If three moles of penta-allylsucrose are polymerized to form a trimer, this trimer presumably has approximately 9 hydroxyls or a few less. If this product were treated with 1 to 9 moles of glycide there are then available an increased number of hydroxyl radicals and may be as many as twice the original number. Such product, if subjected to oxypropylation or oxyethylation or both, yields a molecule which shows a greater branching or a greater branched structure.

The same would apply if the trimer were first treated with ethylene oxide and then with glycide and propylene oxide, or with propylene oxide and with glycide and then with ethylene oxide. However, since the most suitable compounds were obtained without the use of glycide and using the cheaper alkylene oxides, to wit, ethylene oxide and proylene oxide, this phase does not require further elaboration.

Figure 2:
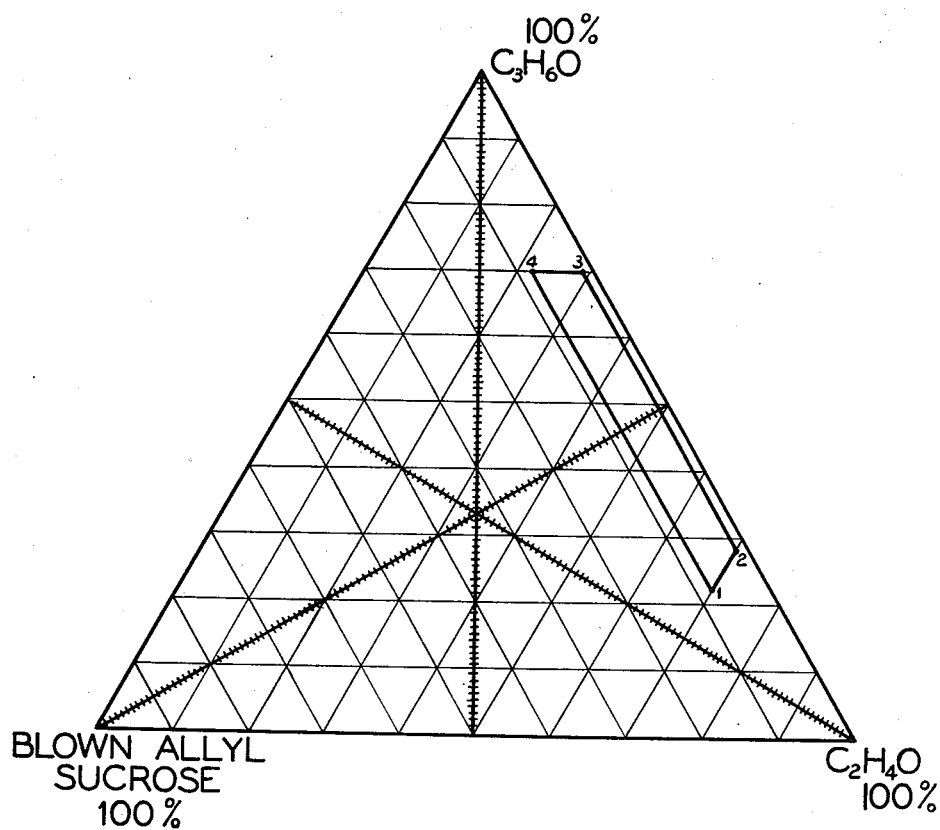
Figure 3:
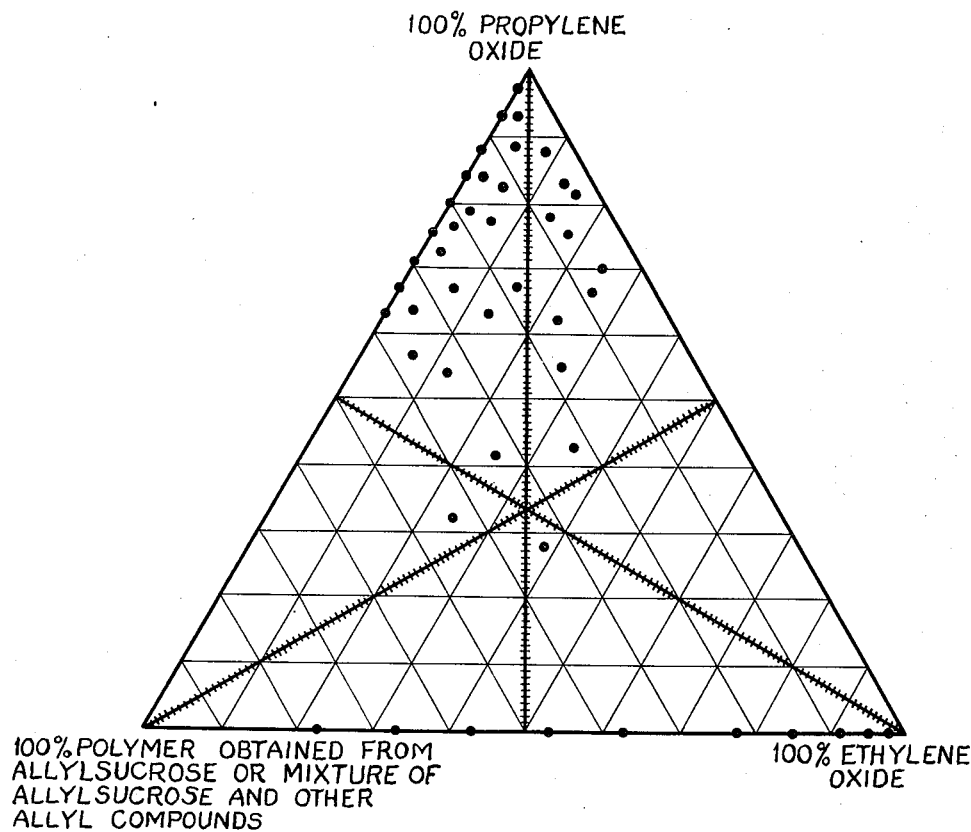

In order to show the variety of materials obtainable by either the use of propylene oxide or ethylene oxide, or a combination of the two, reference is made to the hereto attached drawings, i. e., Figures 2 and 3. In Figure 2 there is a trapezoidal area indicated by the numerals 1, 2, 3 and 4, which shows the composition of materials derived solely from blown allylsucrose as previously described, i. e., the material which is mostly penta-allylsucrose. These particular compositions were effective demulsifiers on a number of oils tested in the Gulf Coast area.

Reference is made to Figure 3 which shows a number of compositions derived not only from blown allylsucrose but also from mixtures of the kind previously described. These mixtures were particularly effective as demulsifiers on a number of California oils.

Entirely aside from what is said herein, reference is made to my co-pending application, Serial No. 146,483, filed February 27, 1950, in which I have referred to an invention within an invention, to wit, a drawing showing a small area essentially in the upper apex and consisting largely of compounds in which propylene oxide is the principal ingredient, which compounds are effective as demulsifiers not only in the two districts above noted but also to a reasonably good extent in the Mid-Continent area.

Returning now to Figure 3, the points on this drawing, some being on the two lines which represent binary mixtures and some being in the conventional triangular area which shows tertiary mixtures, illustrate the products which have been made, not only from such products as represented by Examples 2b, and 3b, preceding, but also from products obtained by the polymerization of mixtures, such as mixtures of the kind exemplified by Examples 2a, 4a, and 5a. Such mixtures, as previously pointed out, can be subjected to polymerization to yield polymerized materials comparable to Examples 1b, 2b and 3b. Such polymers derived from mixtures of allyl compounds are just as satisfactory as far as the oxyalkylation step goes as the polymers derived solely from allylsucrose. The various points on the drawing refer to and illustrate such particular derivatives as well as those derived from polymerized allylsucrose only.

As has been pointed out previously oxyalkylations and particularly oxyethylations and oxypropylations are conducted in a wide variety of conditions, not only in regard to presence or absence of catalyst, kind of catalyst previously described, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 115° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low temperature-low reaction rate oxypropylations have been described very completely in U. S. Patent No. 2,448,664 to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

The same procedure can be employed in polyhydroxylated materials of the kind herein described. Probably less byproducts are formed but the economy of the procedure must be considered, i. e., a much greater length of reaction time.

Since low pressure, low temperature reaction speed oxypropylations require considerable time, for instance, 1 to 7 days of 24 hours each to complete the reaction, they are conducted as a rule whether on a laboratory scale, pilot plant scale, or large scale, so as to operate automatically. The prior figure of seven days applies especially to large-scale operations. I have used conventional equipment of the kind previously described with two added automatic features; (a) a solenoid-controlled valve which shuts off the propylene oxide in event that the temperature gets outside a predetermined and set range, for instance, 110° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is much shorter. In such instances such automatic controls are not necessarily used.

Thus, although the various examples previously noted have been prepared at comparatively high temperatures and pressures I have prepared a few at low pressures using laboratory equipment which is designed to permit continuous oxyalkylation whether it be oxypropylation or oxyethylation.

In a general way I have started out with approximately three to five times as much catalyst as when higher temperatures were employed. In many cases the time of addition was ten to twenty times as long at 110° C., as at 160° to 180° C. The final product also had more residual catalyst, in most instances from ¾% to 1½% as compared with ½% or less in the higher temperature procedure. If the presence of an increased amount of catalyst at the end of the reaction is objectionable, naturally this is another objection to using the low temperature and long reaction time procedure. It is sometimes a nuisance and added expense to remove such excessive amount of alkaline catalyst.

Attention is directed to the fact that a number of the hereto attached claims are characterized by the fact that there is the added proviso that the hydrophile properties of said oxyalkylated derivative in an equal weight of xylene are sufficient to produce an emulsion when said xylene solution is shaken vigorously with one to three volumes of water.

As has been pointed out previously, there is a wide variety of suitable polymers which can be subjected to oxyalkylation by one or more of the alkylene oxides specified or by a mixture of the same. For instance, one might partially oxyalkylate with ethylene oxide and then finish off with propylene oxide. Previous examples illustrate such procedure.

Having obtained a suitable allylsucrose or allylsucrose mixture polymer of the kind described, such allylsucrose polymer is subjected to treatment with a low molal reactive alpha-beta olefin oxide so as to render the product distinctly hydrophile in nature as indicated by the fact that it becomes self-emulsifiable or miscible or soluble in water, or self-dispersible, or has emulsifying properties. The olefin oxides employed are characterized by the fact that they contain not over 4 carbon atoms and are selected from the class consisting of ethylene oxide, propylene oxide, butylene oxide, glycide, and methyl glycidyl ether, ethyl glycidyl ether and propyl glycidyl ether. In any event, however, all such reactants contain the reactive ethylene oxide ring and may be best considered as derivitives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide 1:2. In such compounds the ratio is very favorable to the production of hydrophile or surface-active properties. However, the ratio, in propylene oxide, is 1:3, and in butylene oxide, 1:4. Obviously, such latter two reactants are satisfactorily employed only when the allylsucrose composition is such as to make incorporation of the desired property practical. In other cases, they may produce marginally satisfactory derivatives, or even unsatisfactory derivitives. They are usable in conjunction with the three more favorable alkylene oxides in all cases. For instance, after one or several propylene oxide or butylene oxide molecules have been attached to the allylsucrose polymer, oxyalkylation may be satisfactorily continued using the more favorable members of the class, to produce the desired hydrophile product. Used alone, these two reagents may in some cases fail to produce sufficiently hydrophile derivitives because of their relatively low oxygen-carbon ratios.

Thus, ethylene oxide is much more effective than propylene oxide, and propylene oxide is more effective than butylene oxide. Hydroxypropylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butlyene oxide is definitely less reactive than propylene oxide.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property.

In a general way approximate minimum hydrophile property may be determined by solubility. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

In a number of instances one can determine the fact that one is past the minimum hydrophile-hydrophobe balance, or at least in an optimum zone even though one does not obtain a sol as described immediately preceding, by the fact that the hydrophile character is indicated by the production of an emulsion. For instance, one can prepare an emulsion that contains an inert solvent such as xylene to the extent of 10% to 50%. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former), but, in any event, is due to the hydrophile-hydrophobe balance of the oxyalkylated derivative. I prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to 2 hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein specified compounds for use as demulsifying agents, or for other uses, is based on the conversion of a hydrophobe or non-hydrophile compound or mixture of compounds into products which are distinctly hydrophile at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although I have found that with products of the type used herein, most efficacious results are obtained with products which do not have hydroprile properties beyond the stage of self-dispersibility.

More highly oxyalkylated allylsucrose polymers give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated allylsucrose polymers herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stages of oxyalkylation, one may obtain a water-in-xylene emulsion (water-in-oil type) which is apt to reverse on more vigorous shaking and further dilution with water.

In a few instances, the allylsucrose polymer may not be sufficiently soluble in xylene alone but may require the addition of some ethylene glycol diethyl ether, as described elsewhere. It is understood that such mixture, or any other similar mixture, is considered the equivalent of xylene for the purpose of this test.

In many cases there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification test employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed or other alkylene oxide, for producing products useful for the practice of this invention. Another variation is the molecular size of the allylsucrose polymer as herein described.

Numerous hydroxylated allyl compounds have been described other than allylsucrose. Such compounds, other than allylsucrose, are suitable for the formation of a polymeric mixture as described. Obviously the polymerization of such other compounds alone (other than allylsucrose) which yield oxyalkylation-susceptible polymers can be used to give organic solvent-soluble polymers which in turn can be reacted with the same alkylene oxides in the same manner so as to give analogues of the compounds herein described in detail. Not only that, but such compounds can be mixed with each other or with non-hydroxylated allyl compounds and such mixtures treated in the same manner. The various oxyalkylation products so obtained and particularly those in which the amount of the polymer is not over 10% and in which the amount of propylene oxide is 80%, or more, and the amount of ethylene oxide is comparatively small, for instance, less than 20% and usually less than 10%, serve as effective demulsifiers in the same manner as described elsewhere herein. The preceding percentages are by weight. They are useful also for other purposes, such as additives in making emulsions or as emulsifiers. It is to be noted, however, that this particular class, or classes, of materials and their uses as demulsifiers and for other purposes is not claimed in the instant application.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, an excellent demulsifier can be obtained by mixing 15 parts by weight of xylene and 10 parts by weight of isopropyl alcohol with 75 parts by weight of an oxyalkylated derivative, for example, a product obtained by treating a polymerized allylsucrose identified as Example 2b, preceding, with ethylene oxide and then with propylene oxide, so that the derivative, assuming completeness of reaction, represents 5% blown allylcucrose, 15% ethylene oxide and 80% propylene oxide. Selection of the solvent will vary, depending upon the solubility characteristics of the oxyalkylated product and, of course, will be dictated in part by economic considerations, i. e., cost.

As noted above, the products herein described may be used not only in diluted form but also may be used admixed with some other chemical demulsifier, for instance, a mixture comprising the following:

Oxyalkylated derivative as described in the paragraph immediately preceding, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide selected from the class consisting of ethylene oxide, propylene oxide, butylene oxide, glycide, methylglycide, methyl glycidyl ether, ethyl glycidyl ether and propyl glycidyl ether; and (B) an organic solvent-soluble, oxyalkylation-susceptible polymerization product of a member of the class consisting of allylsucrose, and allylsucrose in combination with other co-polymerizable allyl compounds; in said combination the weight percentage of allylsucrose being not less than 10% and not over 90%; and with the proviso that the hydrophile properties of said oxyalkylated derivative in an equal weight of xylene are sufficient to produce an emulsion when said xylene solution is shaken vigorously with one to three volumes of water.

2. A process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide selected from the class consisting of ethylene oxide, propylene oxide, butylene oxide, glycide, methylglycide, methyl glycidyl ether, ethyl glycidyl ether and propyl glycidyl ether; and (B) an organic solvent-soluble, oxyalkylation-susceptible polymerization product of a member of the class consisting of allylsucrose, and allylsucrose in combination with other co-polymerizable allyl compounds; in said combination the weight percentage of allylsucrose being not less than 10% and not over 90%; and with the proviso that the molecular weight of the oxyalkylation products on an average statistical basis, assuming completeness of reaction, is in excess of 10,000; and with the proviso that the hydrophile properties of said oxyalkylated derivative in an equal weight of xylene are sufficient to produce an emulsion when said xylene solution is shaken vigorously with one to three volumes of water.

3. The process of claim 2 wherein the polymerized allyl derivative is water-insoluble and organic solvent-soluble.

4. The process of claim 2 wherein the polymerized allyl derivative is water-insoluble and organic solvent-soluble, and the allylsucrose is characterized by having at least a plurality of allyl radicals.

5. The process of claim 2 wherein the polymerized allyl derivative is water-insoluble and organic solvent-soluble, and the allylsucrose is characterized by having at least a plurality of allyl radicals, and a plurality of hydroxyl radicals.

6. A process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide selected from the class consisting of ethylene oxide, propylene oxide, butylene oxide, glycide, methylglycide, methylglycidyl ether, ethylglycidyl ether and propylglycidyl ether; and (B) an organic solvent-soluble, oxyalkylation-susceptible, polymerization product of allylsucrose in which there is present a plurality of allyl radicals; and with the final proviso that the hydrophile properties of said oxyalkylated derivative in an equal weight of xylene are sufficient to product an emulsion when said xylene solution is shaken vigorously with one to three volumes of water.

7. A process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide selected from the class consisting of ethylene oxide, propylene oxide, butylene oxide, glycide, methylglycide, methylglycidyl ether, ethylglycidyl ether and propylglycidyl ether; and (B) an organic solvent-soluble, oxyalkylation-susceptible, polymerization product of allylsucrose in which there is present a plurality of hydroxyl radicals; and with the final proviso that the hydrophile properties of said oxyalkylated derivative in an equal weight of xylene are sufficient to produce an emulsion when said xylene solution is shaken vigorously with one to three volumes of water.

8. A process for breaking petroleum emulsions of the water-in-oil type characterized by subjecting the emulsion to the action of a demulsifier including hydrophile synthetic products; said hydrophile synthetic products being oxyalkylation products of (A) an alpha-beta alkylene oxide selected from the class consisting of ethylene oxide, propylene oxide, butylene oxide, glycide, methylglycide, methylglycidyl ether, ethylglycidyl ether propylglycidyl ether; and (B) an organic solvent-soluble, oxyalkylation-susceptible polymerization product of allylsucrose in which there is present a plurality of hydroxyl radicals; with the proviso that the hydrophile properties of said oxyalkylated derivative in an equal weight of xylene are sufficient to produce an emulsion when said xylene solution is shaken vigorously with one to three volumes of water; and with the final proviso that the molecular weight of the oxyalkylation products on an average statistical basis, assuming completeness of reaction, is in excess of 10,000.

9. The process of claim 8 wherein the polymerization product is xylene-soluble.

10. The process of claim 8 wherein the polymerization product is xylene-soluble and the average number of allyl groups on a statistical basis is 5.

11. The process of claim 8 wherein the polymerization product is xylene-soluble and the allylsucrose is essentially penta-allylsucrose.

12. The process of claim 8 wherein the polymerization product is xylene-soluble, the allylsucrose is essentially penta-allylsucrose, and polymerization is the result of blowing by means of a gaseous oxygen-containing medium.

13. The process of claim 8 wherein the polymerization product is xylene-soluble, the allylsucrose is essentially penta-allylsucrose, polymerization is the result of blowing by means of a gaseous oxygen-containing medium, and said polymerization being conducted to just short of stringiness.

14. The process of claim 8 wherein the polymerization product is xylene-soluble, the allylsucrose is essentially penta-allylsucrose polymerization is the result of blowing by means of a gaseous oxygen-containing medium, and said polymerization being conducted to the stage where the product is stringy in undiluted form but is not stringy in a 50% solution of xylene.

15. The process of claim 8 wherein the polymerization product is xylene-soluble, the allylsucrose is essentially penta-allylsucrose, polymerization is the result of blowing by means of a gaseous oxygen-containing medium, and said polymerization being conducted to the stage where the product is stringy even in the form of a 50% solution in xylene.

MELVIN DE GROOTE.

REFERENCES CITED

The following references are of record in the file of this patent:

UNITED STATES PATENTS

| Number | Name | Date |
| --- | --- | --- |
| 2,307,058 | Moeller | Jan. 5, 1943 |
| 2,454,541 | Bock et al. | Nov. 23, 1948 |
| 2,499,365 | De Groote et al. | Mar. 7, 1950 |